July 21, 1964 J. F. McCULLOUGH ETAL 3,141,732
PROCESS FOR PREPARING METAL AMMONIUM PHOSPHATES
Filed Dec. 12, 1961
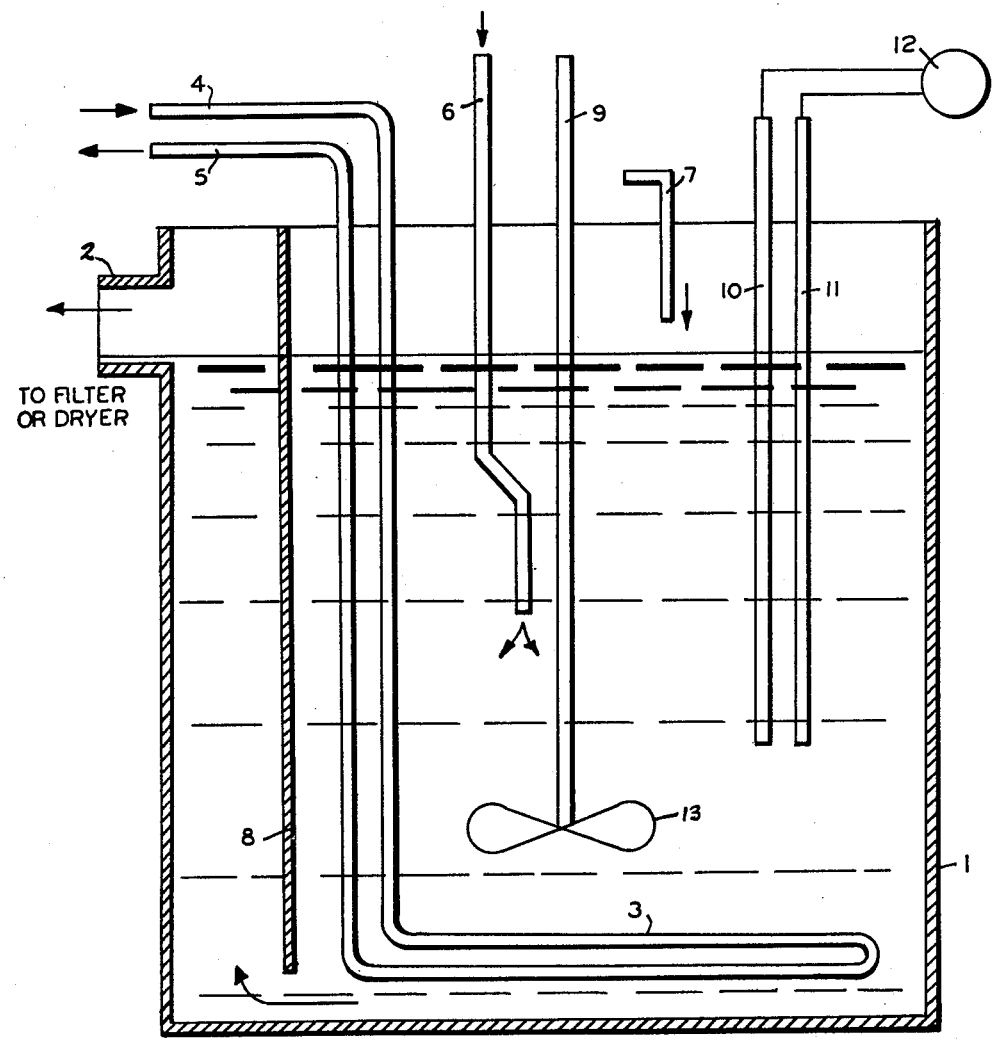
INVENTORS
JOHN F. McCULLOUGH
MURRELL L. SALUTSKY
BY
William W. McDowell Jr.
ATTORNEY

United States Patent Office 3,141,732
Patented July 21, 1964

3,141,732
PROCESS FOR PREPARING METAL
AMMONIUM PHOSPHATES
John F. McCullough, Ellicott City, and Murrell L. Salutsky, Silver Spring, Md., assignors to W. R. Grace & Co., New York, N.Y., a corporation of Connecticut
Filed Dec. 12, 1961, Ser. No. 158,785
1 Claim. (Cl. 23—105)

This invention relates to metal ammonium phosphates and more particularly to a continuous process for preparing metal ammonium phosphates of bivalent metals.

Metal ammonium phosphates are in general known compounds having a wide variety of uses. Use of several metal ammonium phosphates as fire retardants in paints and plastics has been suggested in, e.g., Japanese Patent 173,488 (1946), Dutch Patent 74,804 (1954) and Vol'fkovich et. al., "Ammonium Phosphates of Magnesium, Zinc and Iron," Chem. Abstracts, vol. 50, p. 6243g (1956). U.S. Patent 2,419,017 (1947) describes use of ferrous ammonium phosphate as a rust-inhibiting pigment. In U.S. Patent 2,690,100 (1954) magnesium ammonium phosphate is said to be useful in fire resistant insulation. Use of zinc ammonium phosphate in preparing artificial pearl essences for ornamental plastics and for increasing the corrosion resistance of metals has been described in U.S. Patents 2,555,224 (1951) and 2,514,914 (1950), respectively. Many metal ammonium phosphates have beautiful pastel colors and have thus been found useful as pigments in ceramic glazes as is fully described in copending U.S. patent application S.N. 53,923, filed September 6, 1960, now U.S. Patent No. 3,108,885.

Because of their low solubility and non-toxicity, metal ammonium phosphates are excellent sources of slowly available nitrogen, phosphorus and metallic plant nutrients which makes them particularly suitable for use as fertilizers or in fertilizer compositions.

Until now, metal ammonium phosphates have been prepared by batch methods which require long reaction times and relatively difficult separation and recovery techniques. Insofar as is known no one has suggested or demonstrated a satisfactory continuous process for producing metal ammonium phosphates despite the advantages that can be thereby obtained.

It is an object of this invention to provide a continuous process for the preparation of metal ammonium phosphates. It is another object of this invention to provide a process for preparing in a continuous manner metal ammonium phosphates having improved physical and chemical properties. Further objects of this invention will be obvious to those skilled in the art in view of the more detailed description which follows.

We have found that the above objectives can be accomplished by a process which comprises continuously feeding an aqueous solution of phosphoric acid and a water soluble salt of a divalent metal to a reaction zone, continuously and separately feeding ammonia to said reaction zone at a rate sufficient to provide therein a pH greater than about 6.5, mixing the reaction zone contents to provide a substantially constant pH throughout the reaction mass and continuously withdrawing the metal ammonium phosphate-containing slurry thereby produced at a rate which provides an average residence time in said zone of greater than about four minutes.

Water-soluble divalent metal salts which can be used in the process of this invention include organic and inorganic salts, for example, chlorides, bromides, iodides, nitrates, sulfates, acetates, formates or the like. The metal ammonium phosphates which can be prepared by the process described are those of magnesium, iron, manganese, nickel, cobalt, zinc and cadmium. Suitable sources of phosphoric acid are reagent grade, furnace grade and dilute or concentrated (50–55 percent by weight $P_2O_5$) wet process grade. The reaction can be typified by the following exemplary equation wherein a divalent metal sulfate is the water-soluble metal salt reactant:

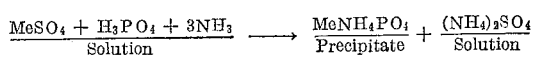

$$\underbrace{MeSO_4 + H_3PO_4 + 3NH_3}_{\text{Solution}} \longrightarrow \underbrace{MeNH_4PO_4}_{\text{Precipitate}} + \underbrace{(NH_4)_2SO_4}_{\text{Solution}}$$

where Me represents a divalent metal of the group described above.

The divalent metal salt is dissolved in water and mixed with phosphoric acid. If necessary, further water is added to the mixture to completely solubilize the phosphoric acid and metal salt. The aqueous solution thereby formed should be as nearly saturated as possible in order to increase the solids content of the metal ammonium phosphate slurry produced and consequently decrease filtering requirements.

Concentrations of the components of the aqueous solution of phosphoric acid and divalent metal salt are preferably chosen to provide a ratio of metal ion to phosphate ion of about one; i.e., the stoichiometric ratio to form $MeNH_4PO_4$. Excess phosphoric acid in virtually any amount may be used if desired, but will, however, result in loss of valuable $P_2O_5$ values in the mother liquor filtered away from the metal ammonium phosphate product. Excess amounts of dissolved divalent metal salt are harmful only to the extent that undesirable insoluble by-products (e.g., triferrous phosphate) may be produced and contaminate the desired metal ammonium phosphate products. In general therefore it will be found preferable to operate with concentration of divalent metal ion not greater than about 5 percent in excess of the stoichiometric amount required to produce metal ammonium phosphate.

In accordance with the invention an aqueous solution of phosphoric acid and divalent metal salt as described above is continuously fed to a reaction zone. Ammonia is then fed continuously to this zone in a separate stream. Ammonia may be fed in the anhydrous form, either as a liquid or gas, or in the form of an aqueous solution. It is also possible to use ammonium salts or compounds which undergo degradation or hydrolysis to form ammonia or ammonium salts (e.g., urea) as sources of ammonia if desired. In any case, sufficient amounts of ammonia are added to raise the pH of the reaction zone contents to at least about 6.5 and preferably to within the range of from about 7 to about 8. Reaction mass pH higher than about 8 can be used but this usually requires an appreciable excess of ammonia and does not result in any noticeable advantages.

The process can be operated at temperatures ranging from room temperature up to about the boiling point of the reaction mixture. At temperatures higher than about 90° centigrade substantial amounts of ammonia will be volatilized, thus requiring increased ammonia feed to maintain the required pH. Hence it is preferred to operate at temperatures below this range. When using high throughput rates and concentrated feeds, the heat of reaction will usually raise the temperature of the reaction mass to boiling and resort to artificial cooling will thus be required. Temperatures of about 75 to about 85° centigrade generally improve the crystalline properties of the metal ammonium phosphate product and operation in this range is thus especially preferred.

As the continuous streams of metal salt-phosphoric acid and of ammonia are fed into the reaction zone, metal ammonium phosphate is continually produced. The metal ammonium phosphate initially formed serves as seed crystals for the product formed by continuous introduction of more reactants. Continuous and thorough mixing is required to provide substantially constant pH throughout the reaction mass and to avoid localized areas of high concentration.

The metal ammonium phosphate produced is continuously withdrawn from the reaction zone as a slurry in an aqueous solution of the ammonium salt byproduct. Withdrawal is at a rate sufficient to provide an average residence time in the reaction zone of greater than about 4 to 5 minutes. Such residence times have been found to give products having excellent crystallinity. The term "average residence time" as used herein can be determined by the following equation:

$$\text{Average residence time} = \frac{\text{Reactor volume}}{\text{Volume rate of slurry withdrawal}}$$

Because of the improved crystallinity resulting from the process of this invention, the product slurry, as compared to slurries produced in batch processes, can have much higher solids content, is much more easily filtered, and gives drier filter cakes which can be rapidly washed.

The metal ammonium phosphate product is ordinarily recovered by filtering the output slurry, washing to remove any occluded mother liquor and ammonium salt by-product, and drying. Filtration and washing can be performed on a continuous basis by use of an endless cloth belt for filtering and washing. Problems that might ordinarily arise in such an operation are virtually non-existent because of the high filtration and washing rates obtained. Although we do not wish to be bound by any specific chemical theory, it is believed that the improved physical properties of products obtained by the process described herein are due to the following conditions which always exist in our process:

(1) Substantially constant pH throughout the reaction mass, precluding formation of insoluble intermediates which might contaminate the product;

(2) Precipitation of metal ammonium phosphate from reaction mixtures dilute in metal and phosphate ions and highly concentrated with respect to ammonium ions, thus driving the reaction in the desired direction;

(3) Formation of metal ammonium phosphate from incoming reactants in the presence of an abundance of previously formed seed crystals.

One outstanding feature of the process of this invention is that it permits the direct production of mixed fertilizer compositions. In this modification, the reaction is conducted at the highest possible concentrations (as, e.g., by heating the feed stream of metal salt and phosphoric acid to raise the amount of reactants soluble therein) to produce slurries containing up to about 55 percent by weight of dissolved and undissolved solids. Such slurries can be directly dried without filtration or washing without unduly burdening the capacity of the drying apparatus used. As an example highly concentrated slurries (45 to 50 percent by weight) produced by continuous reaction of ferrous sulfate, phosphoric acid and gaseous ammonia have not been directly dried to produce mixed fertilizer compositions containing ferrous ammonium phosphate and ammonium sulfate and alalyzing about 13–22–0 (percent by weight N, $P_2O_5$ and $K_2O$ respectively).

In the figure attached hereto there is schematically shown one embodiment of reaction apparatus found suitable for the practice of our continuous process. As shown, the reactor comprises a container 1, having a side outlet weir 2, and equipped with a cooling coil 3 having associated coolant inlet and outlet lines 4 and 5, respectively. An inlet tube 6 is provided for introduction of ammonia into the reaction mass while feed line 7 is used for introducing the aqueous solution of phosphoric acid and a suitable water-soluble divalent metal salt. Paddles 13 mounted on shaft 9 which is in turn driven by suitable drive means (not shown) mix the reaction mass to give substantially constant pH throughout. Baffle 8 assists in obtaining thorough mixing. Electrodes 10 and 11 are connected to a suitable pH meter 12 which records pH of the reaction mixture. Any substantial fluctuations in pH can be corrected by appropriately varying the feed rates of incoming reactants.

Operation is commenced by feeding an aqueous solution of metal salt and phosphoric acid into the container 1 to a level sufficient to cover the outlet end of ammonia inlet tube 6. Ammonia is then introduced into the solution at rates sufficient to provide a pH greater than about 6.5. As the introduction of reactants continues the level of the reaction mass reaches the height of outlet weir 2. Product slurry passes under the bottom of baffle 8, up the side of container 1 and out of weir 2 to suitable filtering or drying means (not shown) depending upon the concentration of the product slurry. Slurry withdrawal rates are adjusted so that the average residence time in the reaction apparatus is at least about 4 minutes and preferably between about 6 and about 9 minutes. Longer residence times may be used if desired, but will not usually provide any advantages. Any problems that may result from oxidation can be eliminated by placing a cover over the reaction container and/or blanketing the reaction mass with an inert gas such as nitrogen, argon, helium or the like.

The invention will be further understood by referring to the non-limiting specific examples which follow.

EXAMPLE 1

*Continuous Production of Ferrous Ammonium Phosphate*

A 2900 milliliter stainless steel reactor, constructed as shown in the figure attached hereto and described above, was equipped with a tight fitting cover, a stirrer, pH electrodes, separate delivery tubes for ammonia and phosphoric acid-ferrous salt solution, a thermometer and a cooling coil. To avoid oxidation of the ferrous salt, provision was made for maintaining a nitrogen blanket over the reaction mass.

An aqueous solution was prepared using 26,666 grams of tap water, 4,462 grams chemically pure copperas ($FeSO_4 \cdot 7H_2O$), and 2,198 grams of reactable $H_3PO_4$ in the form of a wet process phosphoric acid analyzing 55.10% total $P_2O_5$. Reactable $H_3PO_4$ is determined by allowing for the small amounts of aluminum and iron in the wet process acid, and represents $H_3PO_4$ available for reaction to form ferrous ammonium phosphate from the ferrous sulfate in the feed solution. This aqueous solution was continuously fed to the reactor together with a separate continuous stream of gaseous ammonia and the reaction mass thoroughly stirred. The feed rates were so proportioned that a constant pH of about 7.2 to 7.4 was maintained during the run. Since the reactor was open to the atmosphere, as shown at 2 in the drawing, the pressure within the system is ambient pressure. Temperature of the reaction mass was maintained between about 75 and about 80° centigrade, and after initial start-up period ferrous ammonium phosphate slurried in an aqueous solution of ammonium sulfate was withdrawn at a rate of about 83.75 grams per minute. The slurry had a specific gravity of about 1.06 at 65° centigrade and contained between about 9.5 and 10 percent by weight of ferrous ammonium phosphate monohydrate.

The ferrous ammonium phosphate contained in the slurry consisted of grainy crystals which were readily filtered and washed free of occluded ammonium sulfate liquors.

EXAMPLE 2

Ferrous ammonium phosphate monohydrate was continuously produced in the same equipment and in a manner similar to that described in Example 1. A stream from a concentrated solution containing 2,198 grams of reactable $H_3PO_4$, 4,462 grams of technical grade copperas and 10,000 grams of tap water and a stream of gaseous ammonia was fed to the reactor in proportions to give a constant pH of about 7.0 to 7.5 in the thoroughly stirred reaction mass. Reaction temperature was maintained at about 80° centigrade. The product slurry, containing about 19.5% by weight $FeNH_4PO_4.H_2O$ crystals was withdrawn at a rate sufficient to give up to about 1.8 pounds of dried product per hour. The ferrous ammonium phosphate product could be rapidly filtered from the slurry mother liquor. No difficulty was encountered in stirring the high solids content slurry at any time during the run, which lasted for about 4½ hours.

Elemental analysis of washed and vacuum dried samples taken during the course of the run gave the following results:

| Analysis for— | Wt. Percent | |
|---|---|---|
| | Found | Theoretical |
| N | 7.0±.05 | 7.5 |
| $P_2O_5$ | 36.9±.25 | 38.0 |
| Fe | 28.1±.25 | 29.9 |

EXAMPLE 3

By proceeding in the manner described in Example 2, a solution containing 2,198 grams of reactable $H_3PO_4$, 4,462 grams of technical grade $FeSO_4.7H_2O$ and 8,340 grams of tap water and having a specific gravity of 1.270 was continuously ammoniated with gaseous ammonia to produce ferrous ammonium phosphate. The reaction temperature was maintained between 80 and 90° centigrade and the pH was maintained at a substantially constant value in the range of from about 6.9 to about 7.2. No difficulty was encountered in maintaining substantially constant pH. The product slurry contained about 21 percent by weight $FeNH_4PO_4.H_2O$ and was quite fluid. Product was recovered at a rate of about 4.0 pounds of dry $FeNH_4PO_4.H_2O$ per hour. The product slurry was very easily filtered and the filter cake could be rapidly washed, so that no difficulty was experienced in maintaining these high recovery rates.

Vacuum dried samples of product recovered at various intervals during this continuous run gave the following analytical results:

Analysis for: Wt. percent found
N ———————————————— 7.05±0.10
$P_2O_5$ ———————————————— 36.95±0.35
Fe ———————————————— 28.1±0.25

EXAMPLE 4

By using the same reactants and procedure described in Example 3 above, ferrous ammonium phosphate was produced at a rate of about 8.0 pounds of dry product per hour. This corresponds to a yield of about 16 pounds of dry product per hour per gallon of effective reactor volume. This run was made at a temperature of about 80° centigrade and with substantially constant pH of about 7.0±0.3. A nitrogen blanket on top of the reaction mass was used to protect against oxidation by the atmosphere. Average retention time was about 7 minutes.

The product slurry contained about 20 to 22% by weight of $FeNH_4PO_4.H_2O$ and no problems were found in continuously filtering and washing the metal ammonium phosphate crystals. Elemental analysis of 4 washed and vacuum dried product samples gave the following results: Percent N: 6.95±0.10, percent Fe: 27.35±0.5, percent $P_2O_5$: 35.4±1.2.

EXAMPLE 5

A small batch of merchant grade wet process phosphoric acid was obtained from a commercial source of supply. The acid analyzed 55.1% total $P_2O_5$ with a calculated corrected $P_2O_5$ (subtracting non-reactable $P_2O_5$ due to iron and aluminum impurities) content of 52.46 percent by weight. A sample of waste copperas produced in pigment processes was obtained from a paint manufacturer. An aqueous solution containing 4,496 grams of reactable $H_3PO_4$, 8,924 grams of copperas and 16,680 grams of tap water was prepared from these materials. This solution was continuously fed to the reactor described in Example 1 simultaneously with a stream of gaseous ammonia. Reaction temperature was maintained at about 80° centigrade, and the reaction mass was maintained at a substantially constant pH of about 7.0±0.2 by varying the reactant feed rates and by vigorous stirring. The slurry produced contained about 20% by weight $FeNH_4PO_4.H_2O$. The slurry was continuously withdrawn at a rate sufficient to produce 4 pounds of dry product per hour. The filtration rate of the product slurry was very high. Samples were taken from the filter cake at various times during the run, washed with water to remove occluded mother liquor, and vacuum dried. Elemental analysis of these various samples gave the following results: Percent N: 6.6±0.05, percent $P_2O_5$: 38.35±0.45, percent Fe: 27.8±0.15.

In a repeat of the run described immediately above, excellent results were again achieved in continuously producing ferrous ammonium phosphate monohydrate from merchant grade phosphoric acid, waste copperas from the paint industry and ammonia.

EXAMPLE 6

Data was obtained to compare the filtration rates and washing rates of ferrous ammonium phosphate crystals continuously produced from various raw materials in the process described and illustrated in the preceding examples. It was found that very high filtration and washing rates were obtained when pure reactants were used. However, even with impure raw materials the filtration and washing rates were excellent. It is estimated, on the basis of these results, that filtration and washing of metal ammonium phosphate can be conducted at rates of about one ton of product per day per square foot of filter surface without any difficulty.

Specific data was obtained using a Dorr-Oliver vacuum filtration and washing apparatus. Results are given in Table I below.

TABLE I.—FILTRATION AND WASHING OF FERROUS AMMONIUM PHOSPHATE PRODUCED IN CONTINUOUS PROCESS

| Reactants Used | Technically Pure $H_3PO_4$ and $FeSO_4.7H_2O$ | Wet Process $H_3PO_4$, Chemically Pure $FeSO_4.7H_2O$ | Wet Process $H_3PO_4$, Waste Copperas from Paint Industry |
|---|---|---|---|
| Filtration Data: | | | |
| Percent solids in Slurry | 10 | 20 | 21 |
| Temp. (° C.) of Slurry | 54 | 40 | 48 |
| Pressure Differential (inches of mercury) | 500 | 550 | 550 |
| Lbs. of mother liquor per hour per sq. ft. of filter surface | 6,700 | 4,250 | 2,000 |
| Lbs. of dry product per hour per sq. ft. of filter | 870 | 1,800 | 530 |
| Washing Data: | | | |
| Cake thickness (inches) | ¾ | 1 1/16 | ⅝ |
| Temperature (° C.) of wash water | 20 | 20 | 20 |
| Pressure Differential (inches of mercury) | 610 | 610 | 600 |
| Lbs. of Wash Water per hour per sq. ft. of filter cake | 3,940 | 1,185 | 950 |

EXAMPLE 7

Mixed Fertilizer by Continuous Process

A highly concentrated solution containing 4,708 grams of waste copperas, 2,171 grams of reactable $H_3PO_4$ and 2,617 milliliters of tap water was prepared. The source of $H_3PO_4$ was a portion of the merchant grade acid described in Example 5. In order to dissolve all solids in the water it was necessary to heat the solution to about 55° centigrade. In order to be sure that no precipitation would occur in the feed lines the solution was maintained at a temperature of about 70° centigrade. This hot solution was continuously fed to the reactor described above together with a separate stream of gaseous ammonia. The reaction mass was continuously stirred during the entire run to assure good mixing and substantially constant pH throughout. The pH of the mixture was maintained at about 7.0±0.2 during the run and reaction temperature was maintained at about 85° centigrade by passing water through the cooling coil immersed in the reaction mass. The product slurry contained about 29 percent by weight of solid $FeNH_4PO_4 \cdot H_2O$ and about 21 percent by weight of dissolved ammonium sulfate. The slurry was quite thick but no difficulty was experienced in maintaining good stirring. The slurry was withdrawn at a rate to produce about 3.4 pounds of dried $FeNH_4PO_4 \cdot H_2O$ plus $(NH_4)_2SO_4$ product per hour. The concentrated slurry was directly dried in shallow pans at about 70° centigrade. The dried product contained about 60 percent by weight ferrous ammonium phosphate monohydrate and about 40 percent by weight ammonium sulfate. It analyzed 13–22–0 (percent by weight N, $P_2O_5$ and $K_2O$ respectively) and was excellently suited for use as a fertilizer and as an ingredient in mixed fertilizer.

EXAMPLE 8

*Continuous Production of Manganese Ammonium Phosphate*

The reaction apparatus described previously herein was used to prepare manganese ammonium phosphate on a continuous basis. An aqueous solution containing 2,060 grams of chemically pure manganese sulfate, 1,400 grams of $H_3PO_4$ (furnace grade phosphoric acid) and 18,558 grams of deionized water was continuously fed into the reactor. A separate stream of ammonia gas was also introduced in amounts sufficient to provide a constant pH of about 7 in the vigorously stirred reaction mass. A blanket of nitrogen was used to prevent oxidation of the reactants. A thin slurry of large, flaky crystals of $MnNH_4PO_4 \cdot H_2O$ was produced. This slurry was withdrawn at a rate sufficient to produce about 1.9 pounds of dry product per hour. The reaction temperature was maintained at about 80° centigrade over the entire run. The manganese ammonium phosphate crystals were easily filtered from the slurry and readily washed. Elemental analyses of 5 washed and dried samples taken during the course of the run gave the following results:

| Analysis for— | Weight Percent | |
| --- | --- | --- |
| | Found | Theoretical |
| N | 7.33±0.03 | 7.53 |
| $P_2O_5$ | 38.1±0.10 | 38.16 |
| Mn | 29.45±0.20 | 29.53 |

EXAMPLE 9

The run described in Example 8 was repeated using the same raw materials and same reaction conditions except for lower reaction temperature (50 to 55° centigrade) and longer average residence time (product slurry withdrawn at a rate to give about 1.25 pounds of dry product per hour). Under these conditions the crystals produced were more readily filtered from the product slurry and the filter cakes produced were more easily washed. Elemental analyses of samples taken at various times during the run gave the following results.

Analysis for:
                                               Found
  N                                  7.5±0.08
  $P_2O_5$                            38.15±0.15
  Mn                               29.6±0.15

EXAMPLE 10

A solution of phosphoric acid and Tecmangan (a commercial granular solid containing ammonium sulfate with 70 to 80% by weight of manganese sulfate) was reacted with gaseous ammonia to produce a slurry of manganese ammonium phosphate. The reaction was conducted at a temperature of about 50° centigrade and a pH of 7. The aqueous feed solution was sufficiently concentrated to produce a 20% by weight slurry of $MnNH_4PO_4 \cdot H_2O$ and the product slurry was withdrawn at a rate sufficient to give about 8 pounds of dry product per hour. The product crystals could be filtered from the ammonium sulfate mother liquor at very fast rates to give filter cakes that were easily washable. Analysis of washed and dried product showed that it consisted of substantially pure $MnNH_4PO_4 \cdot H_2O$.

EXAMPLE 11

*Continuous Production of Nickel Ammonium Phosphates*

By proceeding in the manner described in the previous examples, an aqueous solution containing 4,511 milliliters of deionized water, 2,078 grams of chemically pure nickel sulfate hexahydrate, and 911 grams of $H_3PO_4$ (furnace grade acid) was reacted with gaseous ammonia at a temperature of about 80° centigrade and a pH maintained substantially constant at about 7.5. A slurry containing about 20% by weight of crystalline solids was produced. This slurry was continuously withdrawn at a rate to give 2 pounds of dry product per hour. The product slurry was easily filtered, and the filter cake was washed and dried. Analysis showed the washed and dried product to be essentially pure $NiNH_4PO_4 \cdot H_2O$. Approximately 1,890 grams of product were recovered, representing a yield of 94.5%.

EXAMPLE 12

*Continuous Production of Cobalt Ammonium Phosphate*

In the same manner as described above, an aqueous solution containing 10,680 milliliters of deionized water, 1,997 grams of chemically pure cobalt sulfate heptahydrate and 810.1 grams of $H_3PO_4$ (furnace grade acid) was continuously introduced into a reactor. Ammonia was separately introduced in amounts sufficient to give a substantially constant pH of about 7.0±0.3, and the reaction mass was maintained at a temperature of about 80° centigrade. The slurry produced, containing 10% by weight of a highly crystalline, fast-filtering product, was initially withdrawn at a rate to produce 2 pounds of dry product per hour. During the latter part of the run the rate was increased to between about 4 and 5 pounds of dry product per hour without causing any noticeable change in filterability or washability. Elemental analyses of samples taken at various times during the run, followed by washing and drying at about 100° centigrade gave the following results:

| Analysis for— | Weight Percent | |
| --- | --- | --- |
| | Found | Theoretical |
| N | 7.26±0.10 | 7.37 |
| $P_2O_5$ | 37.2±0.2 | 37.36 |
| CO | 30.8±0.25 | 31.03 |

In this run the yield of $CoNH_4PO_4 \cdot H_2O$ was 98 percent.

EXAMPLE 13

*Continuous Production of Zinc Ammonium Phosphate*

By proceeding in the same manner described in previous examples, a 94.8 percent yield of zinc ammonium phosphate was produced on a continuous basis from an aqueous solution containing 4,117 milliliters of deionized water and a stoichiometric amount of furnace grade phosphoric acid with 2,415 grams of chemically pure zinc sulfate heptahydrate. The reaction was conducted at a temperature of about 90 to 95° centigrade and a pH of about 7. The slurry produced contained approximately 20% by weight solid. The product slurry was continuously withdrawn at a rate to give about 2 pounds of dry product per hour. The filtering and washing rates were excellent. Samples taken during the course of the run and dried at 100° centigrade gave the following results when analyzed:

| Analysis for— | Weight Percent | |
|---|---|---|
| | Found | Theoretical for $ZnNH_4PO_4$ |
| N | 7.75±0.05 | 7.85 |
| $P_2O_5$ | 40.15±0.35 | 39.8 |
| Zn | 34.8 ±0.6 | 36.65 |

Metal ammonium phosphate products recovered in the preceding examples were very suitable for use in any of the known applications for such products. In addition to those metal ammonium phosphates whose continuous preparation is shown in the specific examples, we have also prepared in a continuous process magnesium ammonium phosphate monohydrate ($MgNH_4PO_4 \cdot H_2O$). Cadmium ammonium phosphate ($CdNH_4PO_4 \cdot H_2O$) can also be made by this process. In all cases, the process described herein gives products having improved crystallinity when compared to products prepared in accordance with known batch procedures. As a result, our process gives equal or better yields, at faster rates and with better product quality.

What is claimed is:

In the process of continuously preparing metal ammonium phosphates comprising continuously introducing into a reaction zone open to the atmosphere an aqueous solution of orthophosphoric acid and about a stoichiometrical equivalent quantity of a water soluble salt of a divalent metal selected from the group consisting of magnesium, nickel, cobalt, and zinc, while separately and continuously introducing ammonia into said zone and mixing the contents of said zone to provide a substantially constant pH throughout the reaction mass and continuously withdrawing the metal ammonium phosphate-containing slurry thereby produced and recovering the metal ammonium phosphate from said slurry, the improvement comprising using in combination the addition of said ammonia at such rate as to provide a pH of about 7.5 in said zone while carrying out the reaction at ambient pressure and while maintaining the temperature in said zone at about 75–85° C., and continuously withdrawing said slurry at such rate as to provide an average residence time in said zone of about 6–9 minutes, and recovering the metal ammonium phosphate from said slurry, thereby obtaining grainy crystals.

References Cited in the file of this patent

UNITED STATES PATENTS

| 1,701,265 | Hofmann | Feb. 5, 1929 |
| 1,881,195 | Kaselitz | Oct. 4, 1932 |
| 1,913,539 | Friedrich | June 13, 1933 |
| 2,037,706 | Curtis | Apr. 21, 1936 |
| 2,847,476 | Steadman | Aug. 12, 1958 |
| 2,957,762 | Young | Oct. 25, 1960 |

OTHER REFERENCES

Friend (Editor): "Textbook of Inorg. Chem.," vol. 10, pp. 34, 35, 47, 50, 123, 126, 133, 189.

Van Wazer: "Phosphorus and Its Compounds," vol. 1, 1958, Interscience Publishers, Ltd., London, page 852.

Mellor: "Comprehensive Treatise on Inorganic and Theoretical Chemistry," vol. 4, pp. 390, 661; vol. 14, pp. 410, 395, 852.

UNITED STATES PATENT OFFICE
CERTIFICATE OF CORRECTION

Patent No. 3,141,732 July 21, 1964

John F. McCullough et al.

It is hereby certified that error appears in the above numbered patent requiring correction and that the said Letters Patent should read as corrected below.

Column 3, line 56, after "have" strike out "not".

Signed and sealed this 24th day of November 1964.

(SEAL)
Attest:

ERNEST W. SWIDER
Attesting Officer

EDWARD J. BRENNER
Commissioner of Patents